(12) United States Patent
Doumaux et al.

(10) Patent No.: US 9,187,667 B2
(45) Date of Patent: Nov. 17, 2015

(54) COLOR AND DURABILITY OF INK-JET INK SETS WITH ADDED LATEX

(75) Inventors: Howard Doumaux, San Diego, CA (US); Philip C. Cagle, San Marcos, CA (US); Pau Soler Pla, Barcelona (ES); Karen Wytmans Waggoner, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1007 days.

(21) Appl. No.: 12/808,046

(22) PCT Filed: Dec. 14, 2007

(86) PCT No.: PCT/US2007/025627
§ 371 (c)(1),
(2), (4) Date: Jun. 14, 2010

(87) PCT Pub. No.: WO2009/078830
PCT Pub. Date: Jun. 25, 2009

(65) Prior Publication Data
US 2010/0272897 A1    Oct. 28, 2010

(51) Int. Cl.
*C09D 11/10* (2014.01)
*C09D 11/40* (2014.01)
*C09D 11/322* (2014.01)

(52) U.S. Cl.
CPC .............. *C09D 11/40* (2013.01); *C09D 11/322* (2013.01)

(58) Field of Classification Search
USPC ....................................... 523/160
See application file for complete search history.

(56) References Cited

U.S. PATENT DOCUMENTS

| | | | |
|---|---|---|---|
| 5,679,142 A | 10/1997 | McInerney et al. | |
| 5,922,118 A | 7/1999 | Johnson et al. | |
| 6,066,215 A | 5/2000 | Simons | |
| 6,538,047 B1 * | 3/2003 | Miyabayashi | 523/160 |
| 7,029,523 B2 | 4/2006 | Taguchi et al. | |
| 7,030,175 B2 | 4/2006 | Vincent et al. | |
| 7,119,133 B2 | 10/2006 | Vincent et al. | |
| 7,157,504 B2 | 1/2007 | Ma et al. | |
| 7,246,896 B2 | 7/2007 | Askeland et al. | |
| 2003/0069329 A1 | 4/2003 | Kubota et al. | |
| 2004/0116596 A1 | 6/2004 | Vincent et al. | |
| 2004/0122131 A1 | 6/2004 | Brown et al. | |
| 2004/0171718 A1 | 9/2004 | Nakamura et al. | |
| 2004/0194659 A1 | 10/2004 | Taguchi | |
| 2005/0039631 A1 * | 2/2005 | Best et al. | 106/31.6 |
| 2005/0137283 A1 | 6/2005 | Frese et al. | |
| 2005/0235867 A1 | 10/2005 | Jackson et al. | |
| 2006/0098066 A1 | 5/2006 | Bauer | |
| 2007/0211126 A1 | 9/2007 | Bauer et al. | |

FOREIGN PATENT DOCUMENTS

| | | |
|---|---|---|
| EP | 1088865 | 4/2001 |
| EP | 1403342 | 3/2004 |
| EP | 1561788 | 8/2005 |
| EP | 1609828 | 12/2005 |
| EP | 1754759 | 2/2007 |
| JP | 2004256737 | 9/2004 |
| JP | 2005298802 | 10/2005 |
| JP | 2006070105 | 3/2006 |
| KR | 10-2006-0092241 | 8/2006 |
| KR | 10-2007-0034586 | 3/2007 |

OTHER PUBLICATIONS

European Search Report dated Jul. 8, 2011 for Application No./Patent No. 07862932.6-2102-2220179, Hewlett-Packard Development Company, L.P. (Applicant).
Search Report from International Searching Authority for PCT/US2007/025627 dated Aug. 25, 2008.
First Examination Report from Government of India Patent Office dated Apr. 22, 2015 for Application No. 3813/DELNP/2010 filed May 31, 2011.

* cited by examiner

*Primary Examiner* — Vu A Nguyen
(74) *Attorney, Agent, or Firm* — Thorpe, North & Western L.L.P.

(57) ABSTRACT

The present disclosure is directed to ink sets and related methods for ink-jet printing on media, such as low-porous or non-porous print media. The inks and ink sets provide good chroma as well as good durability.

20 Claims, No Drawings

COLOR AND DURABILITY OF INK-JET INK SETS WITH ADDED LATEX

BACKGROUND

Inks used in printing on low-porous or non-porous print media, such as vinyl, provide a challenge with respect to generating an image with high durability, high chroma, and good lightfastness simultaneously without the need for an additional lamination step. Although lamination can provide improved durability and color gamut, it results in added expense (both through added materials and increased scrap and incremental labor costs) and slower turn around time. One approach to formulating inks for use in low-porous or non-porous media to achieve the above-described characteristics has been by increasing the pigment concentration in the ink. Unfortunately, this can decrease the durability of the image. Another approach has been to use higher chromatic pigments. Unfortunately, such pigments typically have much lower lightfastness and thus are not desirable for outdoor graphics, a common use for low-porous or non-porous media. A third approach to achieving the above-described characteristics has been adding solution resins. The addition of solution resins suffers from the drawback that these materials often increase the viscosity of the ink, thereby causing the inks to hit their viscosity limit and rendering the inks unreliable in many ink-jet printheads.

Accordingly, investigations continue into developing ink and ink set formulations that are capable of providing high durability, high chroma, and good lightfastness when printed on low-porous or non-porous media without the need for lamination.

DETAILED DESCRIPTION

Before the present invention is disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

In describing and claiming the present disclosure, the following terminology will be used in accordance with the definitions set forth below.

It is noted that, as used herein, the singular forms of "a," "an," and "the" include plural referents unless the context clearly dictates otherwise. Thus, for example, reference to "an ink" includes one or more of such inks, reference to "an amount of pigment" includes reference to one or more amounts of pigments, and reference to "the ink set" includes reference to one or more ink sets.

As used herein, "vehicle," "liquid vehicle" or "ink vehicle" refers to the liquid fluid in which colorant is placed to form an ink. Liquid vehicles are well known in the art, and a wide variety of liquid vehicles may be used in accordance with embodiments of the present disclosure. Such ink vehicles may include a mixture of a variety of different agents, including without limitation, surfactants, solvents, co-solvents, buffers, biocides, viscosity modifiers, sequestering agents, stabilizing agents, and water. The liquid vehicle can also carry other additives such as latexes, polymers, UV curable materials, and/or plasticizers, in some embodiments.

As used herein, "pigment" generally includes solid pigment colorants. Pigments can be dispersed in a liquid vehicle with a separate dispersing agent, or can have dispersing agent attached to its surface, e.g., small molecule or polymeric dispersing agents. As used herein, "ink" refers to a single liquid vehicle that contains a pigment, and in accordance with embodiments of the present disclosure, the inks can also include latex polymer solids.

As used herein, the term "set" refers to a set of inks, whether packaged or made available as part of a set, or packaged and made available separately for use with other members of the set.

As used herein, the term "fastness" refers to that property of the printed image which helps maintain its color characteristics (e.g., Hue, Value, Chroma) which may include light fastness, ozone fastness, water fastness, or a combination thereof.

As used herein, the term "ramp" or "color ramp" refers to printing of inks or ink sets at various densities ranging from very low densities of ink to very high densities of ink. For example, with a black ink, a color ramp can be based on an L* value such that the L* value of a given color ranges from about 0 (black or near black) to about 95 (very light color). With a color (non-black) ink, color ramps can range from a C* or chroma of 0 to 130 depending upon the ink color and composition. Ramps are typically printed as diagnostic to determine the properties of several representative "color" points between two end points. For example, a color ramp might include 5 to 20 printed squares (or other shapes) which are relatively evenly spaced in color density, e.g., a magenta color ramp might include printed squares at C* values of 10, 20, 35, 50, 70, 85, and 95.

The terms "low-porous media" or "non-porous media" each refer to print media which has a Bristow Test of less than 2 ml/m$^2$ at a contact time of less than 0.5 s. The Bristow Test is known in the art and is summarized below. A test specimen of defined dimensions is affixed to the smooth rim of a wheel free to rotate at a defined constant speed in contact with a stationary test fluid applicator pressing against the test specimen with a defined pressure. The test fluid applicator consists of a test solution storage compartment affixed above a 1 by 15-mm test fluid delivery slot, the slot being positioned so that the long dimension is perpendicular to the direction of rotation of the rim of the wheel, and parallel to the wheel axis. A defined quantity of test fluid is placed through the fluid reservoir, onto the fluid delivery slot. With the wheel with the test specimen affixed rotating at constant speed, the test solution applicator is brought into contact with the rotating test specimen and held in place under defined pressure. The test fluid is transferred from the test solution applicator onto the test specimen in a band whose width, controlled by the applicator slot width is approximately 15 mm, and whose length is function of the absorptive characteristics of the test fluid interaction with the test specimen under the defined test conditions. The amount of liquid absorbed per unit area of test specimen is calculated from the volume of test fluid originally placed in the applicator, and the average width and length of the band created on the test specimen by the transferred test fluid. The time available for the liquid absorption is calculated from the volume of test fluid originally placed in the applicator and applicator geometry.

As used herein, "self-dispersed," "dispersant-functionalized" or a derivation thereof generally refers to pigments that have been functionalized with a dispersing agent, such as by chemical attachment of the dispersing agent to the surface of the pigment. The dispersing agent can be a small molecule or a polymer or oligomer. The dispersing agent can be attached to such pigments to terminate the outer shell of the pigment with a charge, thereby creating a repulsive nature that reduces agglomeration of pigment particles within the liquid vehicle.

As used herein, "latex," "latex polymer," or "latex particles" refer to the polymeric masses synthesized from individual monomers, which can be dispersed in a liquid vehicle forming a latex dispersion. The term "latex" generally refers to liquid and polymeric particles that are dispersed within the liquid. However, when a latex is formulated within an ink, the liquid becomes part of the liquid vehicle of the ink, and thus, latex polymer can be described based on the latex particle or latex polymer solids that remain dispersed in the liquid vehicle. It is noted that in accordance with some embodiments of the present invention, the solids of a latex polymer in some inks can increase the absorbance of ink at from 0.1% to 10% compared to an identical ink devoid of the solids of the latex polymer.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

Unless otherwise specified, the path length for the UV absorbance measurements set forth herein is 1 cm.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

The present disclosure is directed to inks and ink sets used for ink-jet printing (e.g. piezoelectric or thermal ink-jet printing). In one embodiment, the ink sets of the present disclosure are formulated for use in thermal ink-jet printing systems such as the DESKJET®, DESIGNJET®, PHOTOSMART®, or other similar family of printers, which are commercially available from the Hewlett-Packard Company of Delaware. The inks of the present disclosure are useful for printing on low-porous or non-porous print media such as pressure-sensitive adhesive backed flexible vinyl media commonly used for outdoor graphics, as well as other low-porous and non-porous print media. Examples of such media include, but are not limited to Avery 1005, Avery 3000, Avery 3100, Avery MPI 1005 EZ, Avery MPI 4002, Ultraflex Normandy Pro, Ultraflex JetFlex FL, Ultraflex Strip Mesh, Ultraflex BIOflex, Verseidag Front Lit Standard Easy P/N 7945, LG Bannux 1100, 3M ScotchCal, Mactac JT5829, MacTac JT5929p, Intelicoat SBL-7SIJ, Intelicoat GFBL5SIJ, 3M Controltac Plus IJ180C-10, 3M ScotchLight, Flexcon See Through Sign Vision, Dykson Jet 220, C2S Sterling Ultra Gloss and the like.

The present disclosure is also related to inks, ink sets, and associated methods and systems used for ink-jet printing (e.g. piezoelectric or thermal ink-jet printing). The ink sets of the present disclosure can include at least two inks selected from the group of black, cyan, magenta, and yellow. Each of the inks is independently described below, but such inks are typically present in ink sets, e.g., cyan, magenta, and yellow; cyan, black, and optionally magenta and yellow; etc.

The black ink for use in the ink sets of the present disclosure, hereinafter referred to as "black ink," can include from 0.25 wt % to 3 wt % solids of a black pigment and from 4 wt % to 15 wt % solids of a latex polymer. When the black ink is diluted to 1:2,500 dilution in water, it has a UV absorbance of 0.040 to 0.468 at about 500 nm. In one embodiment, a 1:2,500 dilution of the black ink can have an absorbance at 500 nm of 0.16 to 0.36. In another embodiment, the black ink can comprise 1.25 wt % to 2 wt % solids of the black pigment and the latex polymer can be present in the black ink at from 5 wt % to 8 wt % by solids.

The black pigment can be any commercially available black pigment that provides acceptable optical density and print characteristics. Such black pigments (Color Index Pigment Black 7, CI PB1 7) can be manufactured by a variety of known methods such as channel methods, contact methods, furnace methods, acetylene methods, or thermal methods, and are commercially available from such vendors as Cabot Corporation, Columbian Chemicals Company, Evonik, and Mitsubishi. For example, commercially available carbon black pigments include Cabot: Monarch™ 1400, Monarch™ 1300, Monarch™ 1100, Monarch™ 1000, Monarch™ 900, Monarch™ 880, Monarch™ 800, and Monarch™ 700, Cab-O-Jet™ 200, Cab-O-Jet™ 300, Black Pearls™ 2000, Black Pearls™ 1400, Black Pearls™ 1300, Black Pearls™ 1100, Black Pearls™ 1000, Black Pearls™ 900, Black Pearls™ 880, Black Pearls™ 800, Black Pearls™ 700; the following are available from Columbian: Raven 7000, Raven 5750, Raven 5250, Raven 5000, and Raven 3500; the following are available from Evonik: Color Black FW 200, Color Black FW 2, Color Black FW 2V, Color Black FW 1, Color Black FW 18, Color Black S 160, Color Black FW S 170, Special Black 6, Special Black 5, Special Black 4A, Special Black 4, Printex U, Printex 140U, Printex V, and Printex 140V, and combinations thereof.

The cyan ink for use in the ink sets of the present disclosure, hereinafter referred to as "cyan ink," can include from 0.25 wt % to 3 wt % solids of a cyan pigment and from 4 wt % to 15 wt % solids of a latex polymer. When the cyan ink is diluted 1:2,500 in water it has a UV absorbance of 0.048 to 0.592 at its absorbance peak found at from 610 nm to 630 nm. In one embodiment, a 1:2,500 dilution of the cyan ink can have an absorbance peak at 610 to 630 nm of 0.16 to 0.38. In another embodiment of the present disclosure, the cyan pigment in the cyan ink can comprises 1.25 wt % to 2 wt % solids of the cyan pigment and the latex polymer can be present in the cyan ink at 5 wt % to 8 wt % by solids.

The cyan pigment can be any commercially available cyan pigment that provides acceptable optical density and print characteristics. Non-limiting examples of cyan pigments include BASF pigments such as Heliogen® Blue L 6901F, Heliogen® Blue NBD 7010, Heliogen® Blue K 7090, Heliogen® Blue L 7101F, Paliogen® Blue L 6470; Heuback pigments such as Heucophthal® Blue G, other pigments such as CI Pigment Blue 15, CI Pigment Blue 15:1, CI Pigment Blue 15:2, Pigment Blue 15:3, and Pigment Blue 15:4, and combinations thereof.

The magenta ink for use in the ink sets of the present disclosure, hereinafter referred to as "magenta ink," can include from 0.75 wt % to 5 wt % solids of a magenta pigment and 4 wt % to 15 wt % solids of a latex polymer. When the magenta ink is diluted 1:2,500 in water it has a UV absorbance of 0.068 to 0.468 at its absorbance peak found at from 520 nm to 555 nm. In one embodiment, a 1:2,500 dilution of the magenta ink can have an absorbance peak at 520 to 555 nm of 0.16 to 0.36. In another embodiment of the present disclosure, the magenta ink can comprise 2.25 wt % to 4.0 wt % solids of the magenta pigment and the latex polymer can be present in the magenta ink at 5 wt % to 8 wt % by solids.

The magenta pigment can be any commercially available magenta pigment that provides acceptable optical density and print characteristics. Non-limiting examples of magenta pigments include CI Pigment Red 5, CI Pigment Violet 19, CI Pigment Red 7, CI Pigment Red 12, CI Pigment Red 48:1-5, Pigment Red 57:1-5 CI Pigment Red 112, CI Pigment Red 122, pigments by Ciba-Geigy such as Irgalite® Rubine 4BL, Monastral® Magenta, and Monastral® Scarlet; pigments by Mobay such as Quindo® Magenta and Indofast® Brilliant Scarlet; and pigments by Hoechst such as Hostaperm® Scarlet GO and Permanent Rubine F6B; others pigments such as Pigment Red 122, Pigment Red 192, Pigment Red 202, Pigment Red 206, Pigment Red 207, Pigment Red 209, Pigment Red 43, Pigment Red 194, Pigment Red 216 and Pigment Red 226, Pigment Red 123, Pigment Red 149, Pigment Red 179, Pigment Red 190, Pigment Red 189, Pigment Red 224, Pigment Red 86, Pigment Red 87, Pigment Red 88, Pigment Red 181, Pigment Red 198, CI Pigment Red 264, and combinations thereof.

The yellow ink for use in the ink sets of the present disclosure, hereinafter referred to as "yellow ink," can include from 1 wt % to 4.5 wt % solids of a yellow pigment and 4 wt % to 15 wt % solids of a latex polymer. When the yellow ink is diluted 1:2,500 in water it has a UV absorbance of 0.176 to 0.784 at its absorbance peak found at from 380 nm to 430 nm. In one embodiment, a 1:2,500 dilution of the yellow ink can have an absorbance peak at 380 to 430 nm of 0.38 to 0.68. In one embodiment of the present disclosure, the yellow ink can comprise 2.5 wt % to 4.5 wt % solids of the yellow pigment and the latex polymer can be present in the yellow ink at 5 wt % to 8 wt % by solids.

The yellow pigment can be any commercially available yellow pigment that provides acceptable optical density and print characteristics. Non-limiting examples of yellow pigments include pigments by Hoechst such as Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Dalamar® Yellow YT-858-D, Hansa Yellow X, Novoperm® Yellow FGL, Hansa Brilliant Yellow 10GX, Permanent Yellow G3R-01, Hostaperm® Yellow H4G, Hostaperm® Yellow H3G, and Novoperm® Yellow HR; pigments by Ciba-Geigy such as Chromophtal® Yellow 3G, Chromophtal® Yellow GR, Chromophtal® Yellow 8G, and Irgazin® Yellow 5GT; and pigments by Sun Chem. such as L74-1357 Yellow, L75-1331 Yellow and L75-2377 Yellow. Other examples include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, CI Pigment Yellow 93, CI Pigment Yellow 110, Pigment Yellow 151, Pigment Yellow 117, Pigment Yellow 128, Pigment Yellow 138, Yellow Pigment 155, CI Pigment Yellow 213, CI Pigment Yellow 150, CI Pigment Yellow 219, CI Pigment Yellow 220 and combinations thereof.

It is noteworthy that any of the pigments used in the inks of the present disclosure can, but do not necessarily have to, be self-disperse pigments. Self-disperse pigments can be a pigment functionalized with a dispersant. The dispersant is typically prepared in a precursor form, and then the precursor is attached to the pigment to chemically modify the surface of the pigment. In one embodiment, the dispersant can be attached to the pigment using various precursor materials, such as para-aminobenzoic acids, isophthalic acids, tricarboxylic acids, carboxylic groups, sulfonylic groups, phosphates, oligomers, polymers, and isomers thereof, for example. Other precursors can also be used to attach to the pigment, as would be known by those skilled in the art. Other pigment types can also be used including encapsulated pigments and disperse pigments.

Generally, any latex polymer commercially available can be used in the inks of the present disclosure including self-dispersed and functionalized latex polymers. Latex polymers can be prepared using any of a number of methods known in the art, including but not limited to emulsion polymerization techniques where co-monomers are dispersed and polymerized in a discontinuous phase of an emulsion. The latexes can also be dispersions of polymer prepared by other techniques known to those in the art. Monomers that are often used include ethyl acrylate; ethyl methacrylate; benzyl acrylate; benzyl methacrylate; propyl acrylate; propyl methacrylate; iso-propyl acrylate; iso-propyl methacrylate; butyl acrylate; butyl methacrylate; hexyl acrylate; hexyl methacrylate; octadecyl methacrylate; octadecyl acrylate; lauryl methacrylate; lauryl acrylate; hydroxyethyl acrylate; hydroxyethyl methacrylate; hydroxyhexyl acrylate; hydroxyhexyl methacrylate; hydroxyoctadecyl acrylate; hydroxyoctadecyl methacrylate; hydroxylauryl methacrylate; hydroxylauryl acrylate; phenethyl acrylate; phenethyl methacrylate; 6-phenylhexyl acrylate; 6-phenylhexyl methacrylate; phenyllauryl acrylate; phenyllauryl methacrylate; 3-nitrophenyl-6-hexyl methacrylate; 3-nitrophenyl-18-octadecyl acrylate; ethyleneglycol dicyclopentyl ether acrylate; vinyl ethyl ketone; vinyl propyl ketone; vinyl hexyl ketone; vinyl octyl ketone; vinyl butyl ketone; cyclohexyl acrylate; methoxysilane; acryloxypropyhiethyldimethoxysilane; trifluoromethyl styrene; trifluoromethyl acrylate; trifluoromethyl methacrylate; tetrafluoropropyl acrylate; tetrafluoropropyl methacrylate; heptafluorobutyl methacrylate; iso-butyl acrylate; iso-butyl methacrylate; 2-ethylhexyl acrylate; 2-ethylhexyl methacrylate; iso-octyl acrylate; and iso-octyl methacrylate.

As stated previously, two or more of the above-described inks can be included together to form an ink set. In one embodiment, an ink set can include the cyan ink and the black ink. In another embodiment, the ink set can further include the magenta ink. In yet another embodiment, the ink set can further include the yellow ink. In a further embodiment, the ink set can further include both the magenta ink and the yellow ink.

In another embodiment, an ink set can include the cyan ink, the magenta ink, and the yellow ink. In one embodiment, the ink set can further include the black ink.

In related embodiments, a system for printing images on low-porous or non-porous media is provided. The system includes a low-porous or non-porous media substrate and an ink set. The ink set can include the cyan ink and the black ink. In one embodiment, the ink-jet of the system can further include at least one of the magenta ink and the yellow ink. Alternatively, the ink set of the system can include the yellow ink, the magenta ink, and the cyan ink. In one embodiment, the system can further include the black ink.

The present disclosure also provides for methods of printing on low-porous or non-porous media. In one embodiment, a method of printing on low-porous or non-porous media comprises ink-jetting an amount of ink from an ink set onto a low porous or non-porous media substrate. The ink set can include the cyan ink and the black ink. In one embodiment, the ink set can further include at least one of the yellow ink or the magenta ink.

In another embodiment, a method of printing on low-porous or non-porous media comprises ink-jetting an amount of ink from an ink set onto a low porous or non-porous media substrate. The ink set can include the cyan ink, the magenta ink, and the yellow ink. In one embodiment, the ink set can further include the black ink.

As shown in Example 12, the black inks of the invention were found to have the surprising characteristic of having a lower L* (i.e. a darker black color) than identical inks having smaller amounts of latex or being devoid of latex. In other words, it was discovered that the L* of the black inks of the present invention can be decreased by increasing the amount of the latex in the ink and without the addition of pigment.

The ink-jet ink compositions used in the ink sets, systems, and methods of the present disclosure are typically prepared using an aqueous formulation or liquid vehicle which can include water, co-solvents, surfactants, buffering agents, biocides, sequestering agents, viscosity modifiers, humectants, binders, and/or other known additives. Typically, the ink-jet ink compositions of the present invention have a viscosity of between about 0.8 cps to about 15 cps, and in one embodiment, can be from about 0.8 cps to about 8 cps. In one aspect, the liquid vehicle can comprise from about 70 wt % to about 95 wt % of the ink-jet ink composition. The liquid vehicle typically comprises water and organic solvent. In one embodiment, the liquid vehicle can comprise water and about 1 wt % to about 70 wt % organic solvent. In another embodiment, the liquid vehicle can comprise water and about 5 wt % to about 50 wt % organic solvent.

Suitable co-solvents for use in the present disclosure include water soluble organic co-solvents, but are not limited to, aliphatic alcohols, aromatic alcohols, diols, triols, glycol ethers, poly(glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, co-solvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, lactams, substituted formamides, unsubstituted formamides, substituted acetamides, and unsubstituted acetamides. Specific examples of co-solvents that are employed in the practice of this disclosure include, but are not limited to, 1,5-pentanediol, 2-pyrrolidone, ethoxylated glycerols such as Liponic ethoxylated glycerol 1 (EG-1) and Liponic ethoxylated glycerol 7 (EG-7), 2-methyl-2,4-pentanediol, 2-methyl-1,3-propanediol, 2-ethyl-2-hydroxymethyl-1,3-propanediol, diethylene glycol, 3-methoxybutanol, propylene glycol monobutyl ether, and 1,3-dimethyl-2-imidazolidinone. Co-solvents can be added to reduce the rate of evaporation of water in the ink to minimize clogging or other properties of the ink such as viscosity, pH, surface tension, optical density, and print quality. Various buffering agents can also be optionally used in the ink-jet ink compositions of the present disclosure. Typical buffering agents include such pH control solutions as hydroxides of alkali metals and amines, such as lithium hydroxide, sodium hydroxide, potassium hydroxide; citric acid; amines such as triethanolamine, diethanolamine, and dimethylethanolamine; and other basic or acidic components. If used, buffering agents typically comprise less than about 10 wt % of the ink-jet ink composition.

In another aspect of the present disclosure, various biocides can be used to inhibit growth of undesirable microorganisms. Several non-limiting examples of suitable biocides include benzoate salts, sorbate salts, commercial products such as NUOSEPT®, UCARCIDE™, VANCIDE®, and PROXEL™ and other known biocides. Typically, such biocides comprise less than about 5 wt % of the ink-jet ink composition and often from about 0.05 wt % to about 2 wt %.

The inks of the present disclosure may also include one or more surfactants may as are known by those skilled in the art of ink formulation. Non-limiting examples of such surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, substituted amine oxides, polyethylene oxide alkyl sulfonates, polyethylene oxide alkyl sulfates, polyethylene oxide alkyl phosphates, and the like, as well as fluorocarbon and silicone surfactants.

EXAMPLES

The following examples illustrate the embodiments of the disclosure that are presently best known. However, it is to be understood that the following are only exemplary or illustrative of the application of the principles of the present disclosure. Numerous modifications and alternative compositions, methods, and systems may be devised by those skilled in the art without departing from the spirit and scope of the present disclosure. The appended claims are intended to cover such modifications and arrangements. Thus, while the present disclosure has been described above with particularity, the following examples provide further detail in connection with what are presently deemed to be the most practical and preferred embodiments of the disclosure.

Example 1

Low Pigment and High Latex Concentration Ink Formulations

Low pigment and high latex concentration inks were prepared according to the formulations set forth in Table 1. Absorbance measurements of a 1:2,500 dilution of each of the prepared inks were also taken and are listed in Table 1.

TABLE 1

| Ingredients (%) | Black | Cyan | Magenta | Yellow |
|---|---|---|---|---|
| Pigment Load (in wt %) | 1.25% | 1.25% | 2.25% | 2.50% |
| Latex Polymer | 7.00% | 7.00% | 7.00% | 6.00% |

TABLE 1-continued

| Ingredients (%) | Black | Cyan | Magenta | Yellow |
|---|---|---|---|---|
| 2-pyrrolidone | 16.00% | 16.00% | 16.00% | 16.00% |
| 2-methyl-1,3-propanediol | 9.00% | 9.00% | 9.00% | 9.00% |
| Polyethylene perfluoro surfactant | 2.00% | 2.00% | 2.00% | 2.00% |
| Water | Balance | Balance | Balance | Balance |
| ABS of 1:2500 Dilution of Ink* | 0.255 | 0.283 | 0.253 | 0.517 |

*The ABS measurements are of the peak absorbance which occurs at the following wavelengths or wavelength ranges: black ink - 500 nm; cyan ink - 610-630 nm; magenta Ink - 520-555 nm; yellow ink - 380-430 nm. The path length was 1 cm.

Example 2

Low Pigment and Medium Latex Concentration Ink Formulations

Low pigment and medium latex concentration inks were prepared according to the formulations set forth in Table 2. Absorbance measurements of a 1:2,500 dilution of each of the prepared inks were taken and are also listed in Table 2.

TABLE 2

| Ingredients (%) | Black | Cyan | Magenta | Yellow |
|---|---|---|---|---|
| Equivalent Pigment Load (in wt %) | 1.25% | 1.25% | 2.25% | 2.50% |
| Latex Polymer | 5.75% | 5.75% | 5.75% | 5.00% |
| 2-pyrrolidone | 16.00% | 16.00% | 16.00% | 16.00% |
| 2-methyl-1,3-propanediol | 9.00% | 9.00% | 9.00% | 9.00% |
| Polyethylene perfluoro surfactant | 2.00% | 2.00% | 2.00% | 2.00% |
| Water | Balance | Balance | Balance | Balance |
| ABS of 1:2,500 Dilution of Ink | 0.244 | 0.276 | 0.249 | 0.505 |

* The ABS measurements are of the peak absorbance which occurs at the following wavelengths or wavelength ranges: black ink - 500 nm; cyan ink - 610-630 nm; magenta Ink - 520-555 nm; yellow ink - 380-430 nm. The path length was 1 cm.

Example 3

Low Pigment and Low Latex Concentration Ink Formulations

Low pigment and low latex concentration inks were prepared according to the formulations set forth in Table 3. Absorbance measurements of a 1:2,500 dilution of each of the prepared inks were taken and are also listed in Table 3.

TABLE 3

| Ingredients (%) | Black | Cyan | Magenta | Yellow |
|---|---|---|---|---|
| Equivalent Pigment Load (in wt %) | 1.25% | 1.25% | 2.25% | 2.50% |
| Latex Polymer | 4.50% | 4.50% | 4.50% | 4.00% |
| 2-pyrrolidone | 16.00% | 16.00% | 16.00% | 16.00% |
| 2-methyl-1,3-propanediol | 9.00% | 9.00% | 9.00% | 9.00% |
| Polyethylene perfluoro surfactant | 2.00% | 2.00% | 2.00% | 2.00% |
| Water | Balance | Balance | Balance | Balance |
| ABS of 1:2,500 Dilution of Ink | 0.234 | 0.269 | 0.239 | 0.49 |

* The ABS measurements are of the peak absorbance which occurs at the following wavelengths or wavelength ranges: black ink - 500 nm; cyan ink - 610-630 nm; magenta Ink - 520-555 nm; yellow ink - 380-430 nm. The path length was 1 cm.

Example 4

Medium Pigment and High Latex Concentration Formulations

Medium pigment and high latex concentration formulations were prepared according to the formulation set forth in Table 4. Absorbance measurements of a 1:2,500 dilution of each of the prepared inks were taken and are also listed in Table 4.

TABLE 4

| Ingredients (%) | Black | Cyan | Magenta | Yellow |
|---|---|---|---|---|
| Equivalent Pigment Load (in wt %) | 1.63% | 1.63% | 2.75% | 3.00% |
| Latex Polymer | 7.00% | 7.00% | 7.00% | 6.00% |
| 2-pyrrolidone | 16.00% | 16.00% | 16.00% | 16.00% |
| 2-methyl-1,3-propanediol | 9.00% | 9.00% | 9.00% | 9.00% |
| Polyethylene perfluoro surfactant | 2.00% | 2.00% | 2.00% | 2.00% |
| Water | Balance | Balance | Balance | Balance |
| ABS of 1:2,500 Dilution of Ink | 0.312 | 0.354 | 0.301 | 0.604 |

* The ABS measurements are of the peak absorbance which occurs at the following wavelengths or wavelength ranges: black ink - 500 nm; cyan ink - 610-630 nm; magenta Ink - 520-555 nm; yellow ink - 380-430 nm. The path length was 1 cm.

Example 5

Medium Pigment and Medium Latex Concentration Ink Formulations

Medium pigment and Medium latex concentration ink were prepared according to the formulations set forth in Table 5. Absorbance measurements of a 1:2,500 dilution of each of the prepared inks were taken and are also listed in Table 5.

TABLE 5

| Ingredients (%) | Black | Cyan | Magenta | Yellow |
|---|---|---|---|---|
| Equivalent Pigment Load (in wt %) | 1.63% | 1.63% | 2.75% | 3.00% |
| Latex Polymer | 5.75% | 5.75% | 5.75% | 5.00% |
| 2-pyrrolidone | 16.00% | 16.00% | 16.00% | 16.00% |
| 2-methyl-1,3-propanediol | 9.00% | 9.00% | 9.00% | 9.00% |
| Polyethylene perfluoro surfactant | 2.00% | 2.00% | 2.00% | 2.00% |
| Water | Balance | Balance | Balance | Balance |
| ABS of 1:2,500 Dilution of Ink | 0.302 | 0.355 | 0.293 | 0.595 |

* The ABS measurements are of the peak absorbance which occurs at the following wavelengths or wavelength ranges: black ink - 500 nm; cyan ink - 610-630 nm; magenta Ink - 520-555 nm; yellow ink - 380-430 nm. The path length was 1 cm.

Example 6

Medium Pigment and Low Latex Concentration Ink Formulations

Medium pigment and low latex concentration inks were prepared according to the formulations set forth in Table 6. Absorbance measurements of a 1:2,500 dilution of each of the prepared inks were taken and are also listed in Table 6.

TABLE 6

| Ingredients (%) | Black | Cyan | Magenta | Yellow |
|---|---|---|---|---|
| Equivalent Pigment Load (in wt %) | 1.63% | 1.63% | 2.75% | 3.00% |
| Latex Polymer | 4.50% | 4.50% | 4.50% | 4.00% |
| 2-pyrrolidone | 16.00% | 16.00% | 16.00% | 16.00% |
| 2-methyl-1,3-propanediol | 9.00% | 9.00% | 9.00% | 9.00% |
| Polyethylene perfluoro surfactant | 2.00% | 2.00% | 2.00% | 2.00% |
| Water | Balance | Balance | Balance | Balance |
| ABS of 1:2,500 Dilution of Ink | 0.292 | 0.346 | 0.284 | 0.589 |

* The ABS measurements are of the peak absorbance which occurs at the following wavelengths or wavelength ranges: black ink - 500 nm; cyan ink - 610-630 nm; magenta Ink - 520-555 nm; yellow ink - 380-430 nm. The path length was 1 cm.

Example 7

High Pigment and High Latex Concentration Ink Formulations

High pigment and high latex concentration inks were prepared according to the formulations set forth in Table 7. Absorbance measurements of a 1:2,500 dilution of each of the prepared inks were taken and are also listed in Table 7.

TABLE 7

| Ingredients (%) | Black | Cyan | Magenta | Yellow |
|---|---|---|---|---|
| Equivalent Pigment Load (in wt %) | 2.00% | 2.00% | 3.25% | 3.50% |
| Latex polymer | 7.00% | 7.00% | 7.00% | 6.00% |
| 2-pyrrolidone | 16.00% | 16.00% | 16.00% | 16.00% |
| 2-methyl-1,3-propanediol | 9.00% | 9.00% | 9.00% | 9.00% |
| Polyethylene perfluoro surfactant | 2.00% | 2.00% | 2.00% | 2.00% |
| Water | Balance | Balance | Balance | Balance |
| ABS of 1:2,500 Dilution of Ink | 0.372 | 0.433 | 0.348 | 0.691 |

* The ABS measurements are of the peak absorbance which occurs at the following wavelengths or wavelength ranges: black ink - 500 nm; cyan ink - 610-630 nm; magenta Ink - 520-555 nm; yellow ink - 380-430 nm. The path length was 1 cm.

Example 8

High Pigment and Medium Latex Concentration Ink Formulations

High pigment and medium latex concentration inks were prepared according to the formulations set forth in Table 8. Absorbance measurements of a 1:2,500 dilution of each of the prepared inks were taken and are also listed in Table 8.

TABLE 8

| Ingredients (%) | Black | Cyan | Magenta | Yellow |
|---|---|---|---|---|
| Equivalent Pigment Load (in wt %) | 2.00% | 2.00% | 3.25% | 3.50% |
| Latex Polymer | 5.75% | 5.75% | 5.75% | 5.00% |
| 2-pyrrolidone | 16.00% | 16.00% | 16.00% | 16.00% |
| 2-methyl-1,3-propanediol | 9.00% | 9.00% | 9.00% | 9.00% |
| Polyethylene perfluoro surfactant | 2.00% | 2.00% | 2.00% | 2.00% |
| Water | Balance | Balance | Balance | Balance |
| ABS of 1:2,500 Dilution of Ink | 0.362 | 0.423 | 0.334 | 0.678 |

* The ABS measurements are of the peak absorbance which occurs at the following wavelengths or wavelength ranges: black ink - 500 nm; cyan ink - 610-630 nm; magenta Ink - 520-555 nm; yellow ink - 380-430 nm. The path length was 1 cm.

Example 9

High Pigment and Low Latex Concentration Ink Formulations

High pigment and low latex concentration inks were prepared according to the formulations set forth in Table 8. Absorbance measurements of a 1:2,500 dilution of each of the prepared inks were taken and are also listed in Table 9.

TABLE 9

| Ingredients (%) | Black | Cyan | Magenta | Yellow |
|---|---|---|---|---|
| Equivalent Pigment Load (in wt %) | 2.00% | 2.00% | 3.25% | 3.50% |
| Latex Polymer | 4.50% | 4.50% | 4.50% | 4.00% |
| 2-pyrrolidone | 16.00% | 16.00% | 16.00% | 16.00% |
| 2-methyl-1,3-propanediol | 9.00% | 9.00% | 9.00% | 9.00% |
| Polyethylene perfluoro surfactant | 2.00% | 2.00% | 2.00% | 2.00% |
| Water | Balance | Balance | Balance | Balance |
| ABS of 1:2,500 Dilution of Ink | 0.352 | 0.42 | 0.336 | 0.664 |

* The ABS measurements are of the peak absorbance which occurs at the following wavelengths or wavelength ranges: black ink - 500 nm; cyan ink - 610-630 nm; magenta Ink - 520-555 nm; yellow ink - 380-430 nm. The path length was 1 cm.

Example 10

Effects of Latex and Pigment Concentrations on Chroma on Glossy Non-Porous Media Ink absorbance is generally determined by the amount of pigment in the ink. The absorbance of the incremental latex loading is seen to be small from these examples. Color ramps were prepared for each of the color degree measures of 30 degree red, 40 degree red, 290 degree blue, and 170 degree green on glossy non-porous media. The color ramps were printed using twenty-one ink levels per color such that all potential combinations of each color were tested for a total of 441 squares. As not all these combinations are realistic to use in printing, the data was filtered to remove points using ink amounts beyond the system limits. Color measurements were made using a X-Rite Eye One iO. Color measurements were taken using D50 illuminant, 2 degree observer and 45/0 geometry as specified by CIE standards. The remaining values were then filtered by hue angle. The largest values were selected and their chroma (C*) and L* were measured. The measurement values are shown in Table 10.

TABLE 10

| Inks | C* | L* |
|---|---|---|
| 30 degree red | | |
| Example 1 | 80.5 | 49.4 |
| Example 2 | 79.6 | 49.6 |
| Example 3 | 76.9 | 49.8 |
| Example 4 | 83.3 | 46.4 |
| Example 5 | 81.5 | 47.5 |
| Example 6 | 80.0 | 48.8 |
| Example 7 | 83.1 | 45.7 |
| Example 8 | 82.3 | 46.8 |
| Example 9 | 79.6 | 48.3 |
| 40 degree red | | |
| Example 1 | 81.6 | 54.8 |
| Example 2 | 83.0 | 52.6 |
| Example 3 | 78.9 | 54.7 |
| Example 4 | 83.6 | 51.8 |
| Example 5 | 81.5 | 54.9 |

TABLE 10-continued

| Inks | C* | L* |
|---|---|---|
| Example 6 | 78.6 | 56.3 |
| Example 7 | 84.1 | 51.7 |
| Example 8 | 79.8 | 53.7 |
| Example 9 | 77.0 | 55.4 |
| 290 degree blue | | |
| Example 1 | 62.8 | 22.1 |
| Example 2 | 63.4 | 21.3 |
| Example 3 | 60.0 | 24.7 |
| Example 4 | 64.0 | 21.0 |
| Example 5 | 62.1 | 22.2 |
| Example 6 | 60.1 | 22.3 |
| Example 7 | 63.6 | 18.4 |
| Example 8 | 62.2 | 22.3 |
| Example 9 | 54.0 | 23.8 |
| 170 degree green | | |
| Example 1 | 81.9 | 43.2 |
| Example 2 | 83.2 | 44.0 |
| Example 3 | 80.8 | 45.6 |
| Example 4 | 82.0 | 40.1 |
| Example 5 | 80.9 | 43.4 |
| Example 6 | 77.1 | 42.4 |
| Example 7 | 78.1 | 37.7 |
| Example 8 | 76.6 | 44.4 |
| Example 9 | 73.9 | 46.2 |

The significance of the measurements is discussed in Example 11.

Example 11

Effects of Latex and Pigment Concentration on Chroma in Matte Non-Porous Media

Color ramps were prepared similarly to Example 10, except that the media was matte non-porous media. The color ramps were printed using twenty-one ink levels per color such that all potential combinations of each color were tested for a total of 441 squares. As in Example 10, not all these combinations are realistic to use in printing, the data was filtered to remove points using ink amounts beyond the system limits. Color measurements were made using a X-Rite Eye One iO. Color measurements were taken using D50 illuminant, 2 degree observer and 45/0 geometry as specified by CIE standards. The remaining values were then filtered by hue angle. The largest values were selected and their chroma (C*) and L* were measured. The measurement values are shown in Table 11.

TABLE 11

| Inks | C* | L* |
|---|---|---|
| 30 degree red | | |
| Example 1 | 77.5 | 49.2 |
| Example 2 | 77.3 | 49.0 |
| Example 3 | 76.4 | 49.0 |
| Example 4 | 79.1 | 47.4 |
| Example 5 | 77.5 | 47.2 |
| Example 6 | 76.9 | 48.8 |
| Example 7 | 80.1 | 45.0 |
| Example 8 | 77.5 | 47.7 |
| Example 9 | 77.1 | 46.6 |
| 40 degree red | | |
| Example 1 | 77.8 | 53.1 |
| Example 2 | 76.3 | 54.7 |
| Example 3 | 74.5 | 55.4 |
| Example 4 | 78.9 | 53.4 |

TABLE 11-continued

| Inks | C* | L* |
|---|---|---|
| Example 5 | 77.2 | 54.6 |
| Example 6 | 75.2 | 54.3 |
| Example 7 | 78.6 | 52.0 |
| Example 8 | 75.6 | 55.2 |
| Example 9 | 74.6 | 55.3 |
| 290 degree blue | | |
| Example 1 | 61.4 | 23.4 |
| Example 2 | 61.0 | 23.2 |
| Example 3 | 58.6 | 25.4 |
| Example 4 | 60.2 | 21.1 |
| Example 5 | 59.2 | 22.1 |
| Example 6 | 59.1 | 20.8 |
| Example 7 | 59.7 | 20.8 |
| Example 8 | 57.9 | 23.3 |
| Example 9 | 58.0 | 22.1 |
| 170 degree green | | |
| Example 1 | 78.7 | 45.8 |
| Example 2 | 77.9 | 46.2 |
| Example 3 | 76.4 | 46.3 |
| Example 4 | 78.5 | 40.6 |
| Example 5 | 75.5 | 42.3 |
| Example 6 | 72.4 | 43.3 |
| Example 7 | 73.9 | 40.6 |
| Example 8 | 73.5 | 43.7 |
| Example 9 | 72.0 | 42.6 |

The differences in chroma appreciated in Examples 10 and 11 are significant as these define the boundary of the color gamut, that is, the maximum range of colors that the printing system can achieve. This is a critical parameter that will determine if a printer is able to print a job with certain color needs. Moreover, it is important to relate these figures with competitive analysis, which ultimately will determine which printing system is used. For example, when comparing to professional color palettes such as Pantone, these chroma values represented will determine which percentage of the colors can be accurately represented (e.g. 80%).

Example 12

Effects of Latex and Pigment Concentration on Lightness in Black Pigmented Inks

Six black inks were prepared using two different pigment concentrations and three different latex concentrations. Each of the pigments was printed onto 3M ControlTac non-porous print media to form a 100% density printed block. The L* measurements of each of the inks printed blocks were measured with an X-rite colorimeter and are set forth below in Table 12.

TABLE 12

| | Wt % Latex | Wt % Black Pigment | L* |
|---|---|---|---|
| Ink 1 | 6.0 | 1.6 | 9.3 |
| Ink 2 | 4.0 | 1.6 | 12.1 |
| Ink 3 | 2.0 | 1.6 | 14.9 |
| Ink 4 | 6.0 | 2.0 | 9.3 |
| Ink 5 | 4.0 | 2.0 | 11.8 |
| Ink 6 | 2.0 | 2.0 | 15.3 |

It was surprisingly discovered that the L* of the black ink decreased (i.e. a darker black was produced) when the latex concentration was increased without increasing the pigment concentration.

While the disclosure has been described with reference to certain preferred embodiments, those skilled in the art will appreciate that various modifications, changes, omissions, and substitutions can be made without departing from the spirit of the disclosure. It is therefore intended that the invention be limited only by the scope of the appended claims.

What is claimed is:

1. An ink set for use in ink-jet printing, comprising:
   a cyan ink comprising from 0.25 wt % to 3 wt % solids of a cyan pigment and from 4 wt % to 15 wt % solids of a latex polymer, and wherein a 1:2,500 dilution in water of the cyan ink has a UV absorbance of 0.048 to 0.592 at its absorbance peak found at from 600 nm to 630 nm; and
   a black ink comprising from 0.25 wt % to 3 wt % solids of a black pigment and from 4 wt % to 15 wt % solids of a latex polymer, and wherein a 1:2,500 dilution in water of the black ink has a UV absorbance of 0.04 to 0.468 at about 500 nm.

2. An ink set as in claim 1, wherein the ink set includes a magenta ink comprising 0.75 wt % to 5 wt % solids of a magenta pigment and 4 wt % to 15 wt % solids of a latex polymer, and wherein a 1:2,500 dilution in water of the magenta ink has a UV absorbance of 0.068 to 0.468 at its absorbance peak found at from 520 nm to 555 nm.

3. An ink set as in claim 2, wherein the magenta pigment comprises 2.25 wt % to 4 wt % solids of the magenta ink.

4. An ink set as in claim 2, wherein the latex polymer comprises from 5 wt % to 8 wt % solids of the magenta ink.

5. An ink set as in claim 1, wherein the ink set includes a yellow ink comprising 1 wt % to 4.5 wt % solids of a yellow pigment and 4 wt % to 15 wt % solids of a latex polymer, and wherein a 1:2,500 dilution in water of the yellow ink has a UV absorbance of 0.176 to 0.784 at its absorbance peak found at from 380 nm to 430 nm.

6. An ink set as in claim 5, wherein the yellow pigment comprises 2.5 wt % to 4.5 wt % solids of the yellow ink.

7. An ink set as in claim 5, wherein the latex polymer comprises 5 wt % to 8 wt % solids of the yellow ink.

8. An ink set as in claim 1, wherein the latex polymer present in at least one of the cyan or black inks is present in an amount of 5 wt % to 8 wt % by solids.

9. An ink set as in claim 1, wherein the black ink comprises 1.25 wt % to 2 wt % solids of a black pigment or the cyan ink comprises from 1.25 wt % to 2 wt % solids of a cyan pigment.

10. An ink set as in claim 1, wherein the presence of the solids of a latex polymer increases the absorbance of the cyan ink or the black ink at from 0.1% to 10% compared to an identical ink devoid of the solids of the latex polymer.

11. An ink set as in claim 1, wherein the L* of the black ink is lower than that of an identical black ink devoid of the latex polymer.

12. An ink set as in claim 1, wherein a 1:2,500 dilution in water of the cyan ink has a UV absorbance of 0.16 to 0.38 at its absorbance peak found at from 600 nm to 630, and wherein a 1:2,500 dilution in water of the black ink has a UV absorbance of 0.16 to 0.36 at about 500 nm.

13. An ink set as in claim 1, wherein the 1:2,500 dilution in water of the cyan ink has a UV absorbance of 0.269 to 0.283 at its absorbance peak found at from 600 nm to 630 nm and wherein the 1:2,500 dilution in water of the black ink has a UV absorbance of 0.234 to 0.255 at about 500 nm.

14. An ink set as in claim 13, further comprising a magenta ink comprising 0.75 wt % to 5 wt % solids of a magenta pigment and 4 wt % to 15 wt % solids of a latex polymer, and wherein a 1:2,500 dilution in water of the magenta ink has a UV absorbance of 0.239 to 0.253 at its absorbance peak found at from 520 nm to 555 nm, and further comprising a yellow ink comprising 1 wt % to 4.5 wt % solids of a yellow pigment and 4 wt % to 15 wt % solids of a latex polymer, and wherein a 1:2,500 dilution in water of the yellow ink has a UV absorbance of 0.49 to 0.517 at its absorbance peak found at from 380 nm to 430 nm.

15. An ink set as in claim 1, wherein the 1:2,500 dilution in water of the cyan ink has a UV absorbance of 0.346 to 0.355 at its absorbance peak found at from 600 nm to 630 nm and wherein the 1:2,500 dilution in water of the black ink has a UV absorbance of 0.292 to 0.312 at about 500 nm.

16. An ink set as in claim 15, further comprising a magenta ink comprising 0.75 wt % to 5 wt % solids of a magenta pigment and 4 wt % to 15 wt % solids of a latex polymer, and wherein a 1:2,500 dilution in water of the magenta ink has a UV absorbance of 0.284 to 0.301 at its absorbance peak found at from 520 nm to 555 nm, and further comprising a yellow ink comprising 1 wt % to 4.5 wt % solids of a yellow pigment and 4 wt % to 15 wt % solids of a latex polymer, and wherein a 1:2,500 dilution in water of the yellow ink has a UV absorbance of 0.589 to 0.604 at its absorbance peak found at from 380 nm to 430 nm.

17. An ink set as in claim 1, wherein the 1:2,500 dilution in water of the cyan ink has a UV absorbance of 0.42 to 0.433 at its absorbance peak found at from 600 nm to 630 nm and wherein the 1:2,500 dilution in water of the black ink has a UV absorbance of 0.352 to 0.372 at about 500 nm.

18. An ink set as in claim 17, further comprising a magenta ink comprising 0.75 wt % to 5 wt % solids of a magenta pigment and 4 wt % to 15 wt % solids of a latex polymer, and wherein a 1:2,500 dilution in water of the magenta ink has a UV absorbance of 0.334 to 0.348 at its absorbance peak found at from 520 nm to 555 nm, and further comprising a yellow ink comprising 1 wt % to 4.5 wt % solids of a yellow pigment and 4 wt % to 15 wt % solids of a latex polymer, and wherein a 1:2,500 dilution in water of the yellow ink has a UV absorbance of 0.664 to 0.691 at its absorbance peak found at from 380 nm to 430 nm.

19. An ink set as in claim 1, wherein the 1:2,500 dilution in water of the cyan ink has a UV absorbance of 0.16 to 0.38 at its absorbance peak found at from 600 nm to 630 nm and wherein the 1:2,500 dilution in water of the black ink has a UV absorbance of 0.16 to 0.36 at about 500 nm.

20. An ink set as in claim 19, further comprising a magenta ink comprising 0.75 wt % to 5 wt % solids of a magenta pigment and 4 wt % to 15 wt % solids of a latex polymer, and wherein a 1:2,500 dilution in water of the magenta ink has a UV absorbance of 0.16 to 0.36 at its absorbance peak found at from 520 nm to 555 nm, and further comprising a yellow ink comprising 1 wt % to 4.5 wt % solids of a yellow pigment and 4 wt % to 15 wt % solids of a latex polymer, and wherein a 1:2,500 dilution in water of the yellow ink has a UV absorbance of 0.38 to 0.68 at its absorbance peak found at from 380 nm to 430 nm.

* * * * *